United States Patent [19]

Hirano

[11] 4,118,780
[45] Oct. 3, 1978

[54] TECHNIQUE FOR MONITORING FLOW RATE DIFFERENCES IN WATER COOLING CONDUIT

[75] Inventor: Toru Hirano, Yokohama, Japan

[73] Assignee: Hokushin Electric Works, Ltd., Tokyo, Japan

[21] Appl. No.: 761,242

[22] Filed: Jan. 21, 1977

[30] Foreign Application Priority Data

Jan. 29, 1976 [JP] Japan .................................. 51-8915

[51] Int. Cl.$^2$ ........................ G01F 1/08; G06F 15/20
[52] U.S. Cl. ...................................... 364/510; 73/40; 73/196; 364/571
[58] Field of Search ........... 235/151.3, 151.34, 92 FL; 73/194 R, 194 VS, 194 G, 194 E, 195, 196, 40, 405 R; 137/312; 340/239 R, 242; 364/509, 510, 571

[56] References Cited

U.S. PATENT DOCUMENTS

| 3,505,513 | 4/1970 | Fowler et al. | 235/151.34 |
| 3,664,357 | 5/1972 | Kreiss | 73/196 |
| 3,711,689 | 1/1973 | Park | 73/196 |
| 3,723,987 | 3/1973 | Barone, Jr. et al. | 73/196 |
| 3,854,038 | 12/1974 | McKinley | 235/151.34 |
| 3,965,341 | 6/1976 | Honey et al. | 235/151.34 |
| 3,979,954 | 9/1976 | Ide et al. | 73/194 VS |
| 3,987,662 | 10/1976 | Hara et al. | 235/151.34 |

OTHER PUBLICATIONS

Richardson et al; Computer Aids Pipeline Control; Automation; Jan. 1961; vol. 8, No. 1.
Kovacs, S; Advanced Turbine Meters for Measurement of Quantities; Hungarian Heavy Industries; (Hungary), vol. 21, No. 1 (1971).

*Primary Examiner*—Malcolm A. Morrison
*Assistant Examiner*—Errol A. Krass
*Attorney, Agent, or Firm*—Michael Ebert

[57] ABSTRACT

A technique for monitoring the frequency difference between pulse output signals derived from a pair of flowmeters interposed respectively in the inlet and outlet lines of a flow conduit supplying cooling water to the tuyere of a blast furnace, the frequency difference being indicative of water leakage. The furnace has a plurality of such tuyeres, each conduit of which is monitored. The pulse output signals from the flowmeters at each monitoring point are fed to a common processing unit in which there are stored the constants representing the instrumental error between each pair of flowmeters as well as their mean conversion constants. In the processing unit, computations are carried out on the basis of the pulse output signals derived from each pair of flowmeters, the instrument error constant thereof and their mean conversion constants, in order accurately to determine the flow rate difference therebetween at each monitoring point independently of the instrumental error.

4 Claims, 3 Drawing Figures

TECHNIQUE FOR MONITORING FLOW RATE DIFFERENCES IN WATER COOLING CONDUIT

BACKGROUND OF INVENTION

This invention relates generally to techniques for monitoring a water flow conduit to detect water leakage, and more particularly to a monitoring system in which like flow-meters, each generating a pulse signal whose frequency depends on flow rate, are respectively interposed in the inlet and outlet lines of the conduit to produce output signals which are compared to determine whether a frequency difference exists therebetween indicative of leakage.

Iron ore is reduced to pig iron in a blast furnace. Circumferentially disposed near the top of the hearth section of the furnace are tuyeres which function to admit air therein for combustion, each tuyere being cooled by water passing through a flow conduit. It is important to detect water leakage from the conduit; for should leakage occur, the quality of iron produced by the furnace will be degraded. Moreover, with heavy water leakage, there is danger of explosion. Monitoring of the cooling water is therefore essential.

To carry out such monitoring, it is known to use a pair of vortex-shedding or Karman-type flowmeters, one being interposed in the inlet line to the cooling conduit, and the other in the outlet line therefrom. A vortex flowmeter includes an obstacle in the flow path which generates fluidic oscillations as a function of flow rate, these oscilations being sensed to produce a pulse signal whose frequency is proportional to flow rate. The pulse output signals from the pair of flow-meters are applied to a comparator which yields an analog output signal that depends on the difference in frequency between the applied signals.

Ideally, with flowmeters of identical size and type, no difference signal will be yielded by the comparator in the absence of any leakage, for then the inlet and outlet flow rates will be the same and the resultant output pulse signals from the like flowmeters will be equal. But in practice, no two flowmeters, even though nominally identical, will have exactly the same input-output conversion characteristics. Hence for a given flow rate, each meter will produce an output pulse signal which differs in frequency from the signal produced by the other supposedly-identical meter. Thus flowmeters are subject to so-called instrumental error.

While it has heretofore been known to provide in conjunction with each flowmeter in the monitoring system an adjustable converter to effect span adjustment thereof in order to bring about a proper match of the flowmeter pair, such individual adjustments to correct for instrumental error are difficult to carry out, and are time-consuming, particularly when in a given blast furnace installation, there are more than twenty tuyeres, each with a cooling conduit whose water flow must be monitored.

SUMMARY OF INVENTION

In view of the foregoing, it is the main object of this invention to provide an improved monitoring technique and a system based thereon for detecting the existence of leakage in a water conduit.

More particularly, it is an object of this invention to provide a monitoring system including like flowmeters interposed in the inlet and outlet lines of the water conduit, each generating a pulse output signal whose frequency is proportional to flow rate, the system obviating the need for individual adjustment of each flowmeter to correct for instrumental error, whereby the time for adjustment is markedly reduced.

Briefly stated, these objects are attained by first determining the ratio between the pulse output signals of the flowmeter under fixed flow conditions to provide an instrumental error constant, and then computing the flow rate difference between flow detected in the input and output lines of the conduit under normal operating conditions on the basis of the detected flow signals, the instrumental error constant and the mean conversion constants of the flowmeters.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Prior Art

Figure 1:
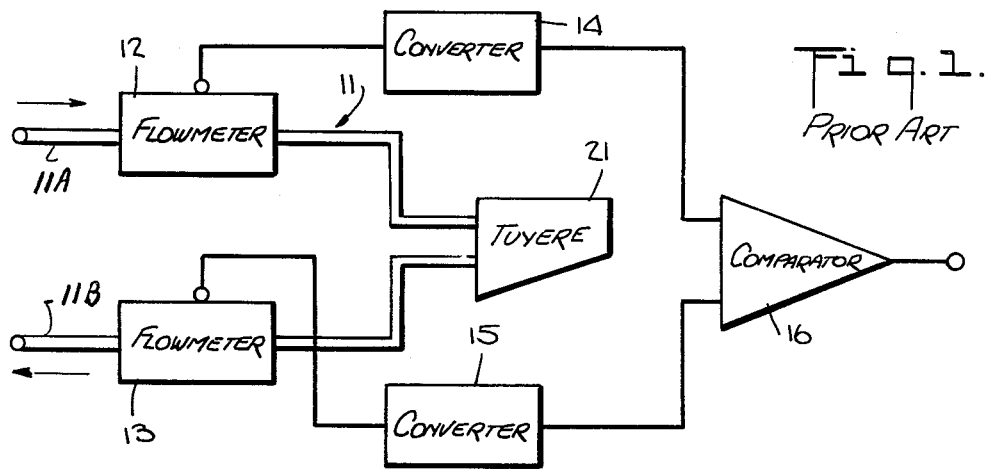
FIG. 1 is a block diagram of a prior art monitoring system for detecting leakage in a water conduit for a tuyere.

Referring now to FIG. 1, there is shown a known type of monitoring system for detecting the existence of leakage in cooling water being fed through a conduit 11 for a tuyere 21. Interposed in the water inlet line 11A is a flowmeter 12, and interposed in the outlet line 11B is a flowmeter 13, both meters being preferably of the vortex-shedding type to produce a pulse signal whose frequency depends on flow rate. Vortex-shedding flowmeters have several significant advantages, such as low manufacturing cost and excellent repeatability.

In the conventional monitoring system, the pulse output signals from flowmeters 12 and 13 are converted into corresponding current signals which are applied to a difference circuit or comparator 16 that yields an analog signal depending on the difference therebetween. When the flow rates measured by flowmeters 12 and 13 are equal, this is indicative of the absence of any leakage.

However, as pointed out previously, because of instrumental error, even though the flow rates in the input and output lines 11A and 11B are equal and no leakage exists, the flowmeters will nevertheless produce somewhat unequal outputs and provide a misleading indication.

This instrument error will now be explained in connection with FIG. 2, where characteristic curves 17 and 18 represent the input-output conversion constants of the vortex-shedding flowmeters 12 and 13, respectively.

Figure 2:
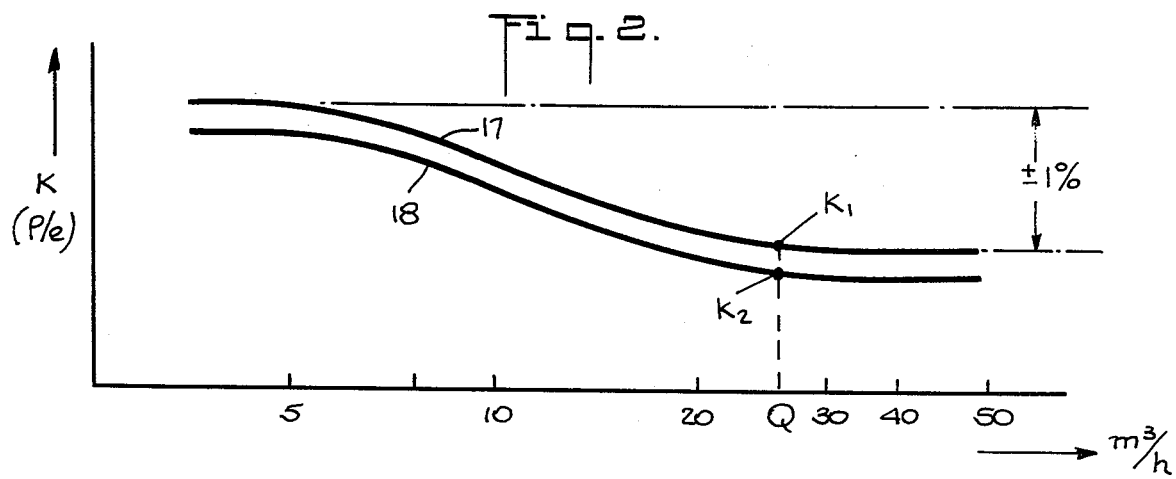
FIG. 2 illustrates the characteristic curves of the conversion constants of the flowmeters included in the monitoring system.

In FIG. 2, the abscissa or X axis represents the flow rate ($m^3/h$) of the vortex-shedding meter, and the ordinate or Y axis shows the conversion constant K (P/1); that is, the number of vortices per liter. As is evident from this figure, characteristic curves 17 and 18 are different for each meter. However, each conversion constant K has the same tendency, for it decreases with an increase in flow rate.

Since the conversion constant of meter 12 in the inlet line differs from that of meter 13 in the outlet line, it is impossible to accurately measure the flow rate difference therebetween. As a result of such instrumental error, an error difference signal will be yielded in the output of comparator 16, even though the actual flow rate difference is zero.

With a view to overcoming this drawback, it is the conventional practice to insert a converter 14 in the output of flowmeter 12 and a converter 15 in the output of flowmeter 13, each serving to adjust the span of the associated meter so that the outputs applied to comparator 16 will be equal when the actual flow rate difference is zero.

Between 20 to 40 tuyeres are usually included in a single blast furnace. Each of these tuyeres requires a pair of flowmeters for monitoring the cooling water conduit as well as a pair of adjustable converters. It therefore takes a great deal of time to carry out the necessary span adjustments.

Moreover, since undesirable drifts take place in converters 14 and 15, these troublesome adjustments must be repeated. And since it is also the practice to include filter circuits in the converters having relatively long time constants (about 10 seconds), it takes some time before the converter output reaches a stabilized condition after a span adjustment, thereby further prolonging the time it takes to carry out the necessary adjustments.

THE INVENTION

The present invention is based on the following concepts:

A. When flowmeters of identical size and type are used, the difference between their conversion constants is relatively small. Moreover, one can predetermine the mean conversion constants of the meters.

B. In monitoring flow rate differences, it is not necessary to detect actual flow rates.

In FIG. 2, when the difference between inlet flow rate and output flow rate is zero, one can derive the following equation:

$$Q = (f_1/K_1) = (f_2/K_2) \quad (1)$$

where:
$K_1$ is the conversion constant (P/l) of inlet flowmeter 12;
$K_2$ is the conversion constant (P/l) of outlet flowmeter 13;
$f_1$ is the frequency (Hz) of the pulse output signal of flowmeter 12;
$f_2$ is the pulse frequency (Hz) of the pulse output signal of flowmeter 13;
$Q$ is the volumetric flow rate (l/sec).

When a flow rate difference arises between the inlet and outlet flow rates, this difference ($\Delta Q$) is given by the following equation if the conversion constant K of flowmeters 12 and 13 remain as $K_1$ and $K_2$, respectively:

$$\Delta Q = (f_1/K_1) - (f_o/K_2) \quad (2)$$

where $f_1$ and $f_o$ are the frequencies of the respective output pulse signals from flowmeters 12 and 13 when a flow rate difference is encountered.

By using equation (1), we may change equation (2) in the following manner:

$$\Delta Q = f_1/K_1 - f_1/(K_1 f_2) \cdot f_o = 1/K_1 (f_1 - (f_1/f_2) \cdot f_o) \quad (3)$$

It is to be noted that the conversion constant K for each flowmeter changes in the same manner as shown by curves 17 and 18 in FIG. 2, and that the deviations thereof are less than 1 percent over the full scale. Hence when the range is limited to more or less 50 percent of full scale, this deviation can be made less than 0.5 percent. This signifies that the amount of deviation is very small and that even though the conversion constant K is fixed over this range, the resultant error is negligible.

In other words, the error in the measurement of the flow rate difference may be made less than 0.5 percent even though a fixed mean conversion constant $\overline{K}$ is used in place of constant $K_1$ in equation (1). Consequently, if the ratio of frequencies $f_1$ to $f_2$ is first determined, the flow rate difference can be measured accurately within a 0.5% error.

If, for example, a blast furnace installation has many tuyeres and hence an equal number of monitoring points, the mean conversion constant $\overline{K}$ at each of these points may be stored in by the memory of a micro computer. At each of these monitoring points, one can, by supplying a fixed amount of liquid to the inlet of the conduit, determine the values of $f_1$ and $f_2$ yielded by flowmeters 12 and 13, respectively. From these values, one may determine the ratio $f_1/f_2$ representing the instrumental error constant. The ratios or instrumental error constants derived from the several monitoring points may be separately stored in the memory.

Since the maximum output frequency of the conventional Karman-vortex flowmeter is 120 Hz or so, after the number of counted pulses from flowmeter 12 in the inlet pipe reaches 10,000, the frequency of signals $f_1$ and $f_2$ from flowmeters 12 and 13 are measured in order to obtain the ratio $f_1/f_2$. Thereafter, the frequencies of the output pulse signals from the inlet and outlet line flowmeters are measured after every predetermined period. From these detected flow signals, the stored instrumental error constant $f_1/f_2$ and the stored mean conversion constant $\overline{K}$, one may determine from equation (3) the value of the flow rate difference $\Delta Q$. One may also separately obtain the flow rate $f_1/\overline{K}$ at the inlet line and the flow rate $1/\overline{K} \cdot f_1/f_2 \cdot f_o$ at the outlet line, if these values are required.

Figure 3:
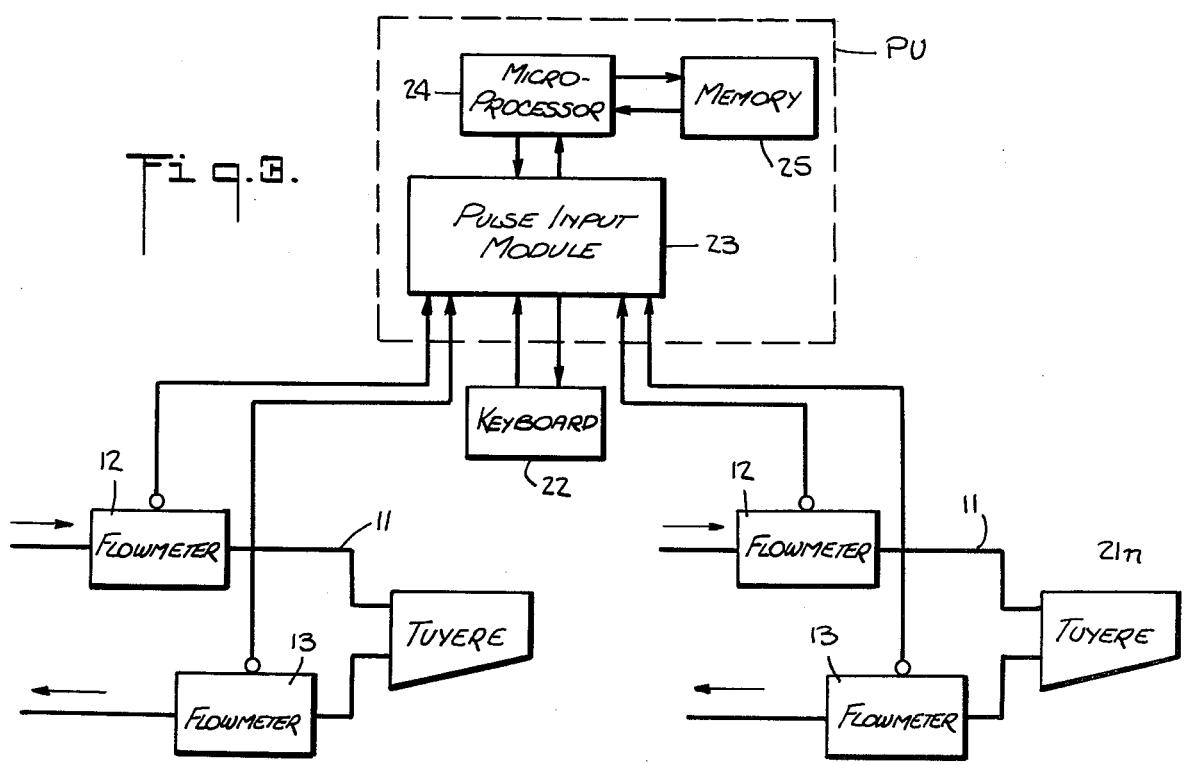
FIG. 3 is a block diagram of a preferred embodiment of a monitoring system in accordance with the invention.

Referring now to FIG. 3, there is shown a preferred embodiment of a monitoring system for a blast furnace having a plurality of tuyeres 21a to 21n, each provided with a water cooling conduit 11 having a flowmeter 12 in the inlet line and a flowmeter 13 in the outlet line, each pair of flowmeters constituting a monitoring point.

The pulse output signals derived from the pair of flowmeters at each monitoring point are selectively read into the pulse input module 23 of a processing unit PU in accordance with instructions provided by a keyboard or operational console 22 associated with this unit. In the processing unit, the input module 23 cooperates with a microprocessor 24 and a memory 25.

The pulse output signals from the flowmeters which are read into module 23 are counted and integrated therein. With this integrated value, the following computation is carried out in micro-processor 24:

$$\Delta Q = 1/\overline{K} (f_1 - f_1/f_2 \cdot f_o);$$

$$f_1/\overline{K}; \text{ or}$$

$$1/\overline{K} \cdot f_1/f_2 \cdot f_o$$

The resultants or measured values from these computations are stored in memory 25.

Instructions for instrumental error adjustment and measurement of flow rate difference are given to the processing unit by console 22 for each monitoring point. The instructions provided by console 22 for each monitoring point can be given sequentially or selectively.

As previously explained, the monitoring technique in accordance with the invention obviates the need for individual and troublesome instrumental error adjustments for the respective flowmeters. Hence the time necessary for the necessary adjustments may be made short. Moreover, since flowmeters generating a pulse output signal are used and the flow rate differences are determined by counting the number of pulses yielded by the pair of flowmeters at each monitoring point, there is no need for analog signal conversion (converters 14 and 15) as in prior methods, and adjustments are simple and quickly accomplished.

With an analog signal conversion arrangement, because of drift problems, adjustments must often be made; whereas in the present invention, except for the initial adjustment, further adjustments are unnecessary unless the conversion characteristic of the flowmeter changes, which is unlikely.

When flowmeters of the same type and size are used throughout the monitoring system for the multi-tuyere blast furnace, instrumental error adjustments for every flowmeter may be automatically made, even though the individual characteristic curves of the conversion constants K are not known. Hence adjustments of the many monitoring points may be carried out quickly. One may also include alarm means to indicate that an instrumental error adjustment is impossible when the instrument error of the inlet and outlet flowmeters increase over a predetermined acceptable value.

While in the foregoing, flowmeters included in the monitoring system are all of the Karman-vortex type, in lieu thereof one may use swirl-blade type flowmeters or turbine flowmeters which generate pulse output signals as a function of flow rate. Even electromagnetic flowmeters may be used, but in this instance the output thereof must be converted into a corresponding pulse signal.

While there has been shown and described a preferred embodiment of a technique for monitoring flow rate difference in water cooling conduit in accordance with the invention, it will be appreciated that many changes and modifications may be made therein without, however, departing from the essential spirit thereof.

I claim:

1. A system for detecting leakage from a flow conduit having an input line and an output line through which line water is supplied to a device, said system comprising:
   A. a pair of flowmeters interposed, respectively, in said input and output lines, each of said flowmeters producing an output signal whose frequency is a function of flow rate, said flowmeters being subject to instrument error whereby the same amount of test water flowing through both flowmeters results in flowmeter output signals $f_1$ and $f_2$ which differ slightly in frequency, the ratio of $f_1$ to $f_2$ representing the instrument error constant;
   B. a microprocessor;
   C. a memory associated with said microprocessor, said memory having stored therein said instrument error constant; and
   D. an input module coupling said flowmeters to said microprocessor to apply as input data thereto the frequencies of the output signals resulting from the flow of line water in said input and output lines, said microprocessor determining the frequency difference between said signals and consulting said memory to effect a correction in said frequency difference in accordance with said instrument error constant to provide an output that is indicative of leakage and is independent of said instrument error.

2. A system as set forth in claim 1, wherein said device is the tuyere of a blast furnace.

3. A system as set forth in claim 1, wherein said flowmeters are constituted by Karman-vortex type flowmeters 4. A system as set forth in claim 2, wherein said blast furnace includes a plurality of tuyeres, each having a pair of said flowmeters in the water cooling conduit associated therewith to define a monitoring point, and said input module selects any one of the monitoring points and applies it to said microprocessor to compute the frequency difference for the selected monitoring point to determine whether a leak exists thereat.

* * * * *